United States Patent
Bamba

(10) Patent No.: US 12,067,770 B2
(45) Date of Patent: Aug. 20, 2024

(54) IMAGE PROCESSING APPARATUS, IMAGE PROCESSING METHOD, AND STORAGE MEDIUM FOR DETERMINING A NUMBER OF PERSONS IN AN INPUT IMAGE

(71) Applicant: CANON KABUSHIKI KAISHA, Tokyo (JP)

(72) Inventor: Yasuo Bamba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 337 days.

(21) Appl. No.: 17/541,081

(22) Filed: Dec. 2, 2021

(65) Prior Publication Data
US 2022/0180098 A1 Jun. 9, 2022

(30) Foreign Application Priority Data
Dec. 7, 2020 (JP) .................. 2020-202919

(51) Int. Cl.
*G06K 9/00* (2022.01)
*G06T 7/70* (2017.01)
*G06V 20/00* (2022.01)
*G06V 40/10* (2022.01)

(52) U.S. Cl.
CPC ............... *G06V 20/00* (2022.01); *G06T 7/70* (2017.01); *G06V 40/10* (2022.01); *G06T 2207/30242* (2013.01)

(58) Field of Classification Search
CPC ........ G06V 20/00; G06V 40/10; G06V 20/53; G06T 7/70; G06T 2207/30242
See application file for complete search history.

(56) References Cited

U.S. PATENT DOCUMENTS

| | | | |
|---|---|---|---|
| 2019/0206085 A1* | 7/2019 | Jiang | G06T 7/74 |
| 2023/0005271 A1* | 1/2023 | Saitoh | G06V 20/52 |
| 2023/0075836 A1* | 3/2023 | Tang | G06V 10/82 |

FOREIGN PATENT DOCUMENTS

JP 2015528614 A 9/2015

OTHER PUBLICATIONS

Cao, Zhe, et al. "OpenPose: Realtime Multi-Person 2D Pose Estimation using Part Affinity Fields." arXiv preprint arXiv:1812.08008 (2019). (Year: 2019).*

* cited by examiner

*Primary Examiner* — Andrew M Moyer
(74) *Attorney, Agent, or Firm* — Canon U.S.A., Inc. IP Division

(57) ABSTRACT

An image processing apparatus includes a first detection unit configured to detect a person in an input image, a second detection unit configured to detect a specific object in the input image, a specification unit configured to specify a combination of the detected person and the detected object indicating an identical person, and a determination unit configured to determine a number of person in the input image, based on the detected person, the detected object, and the specified combination.

13 Claims, 9 Drawing Sheets

FIG.1
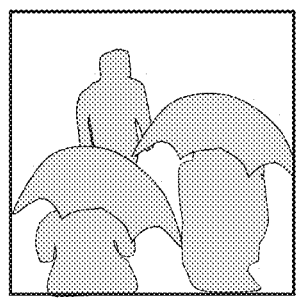
101
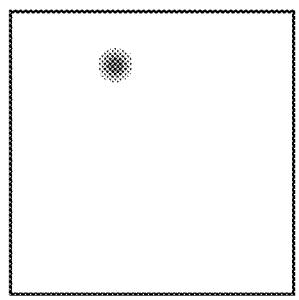
102
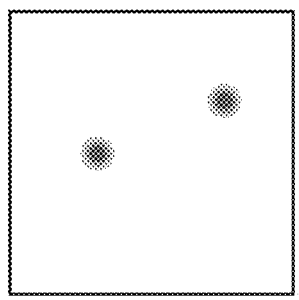
103
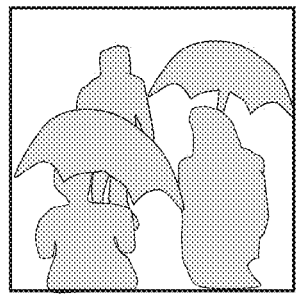
104
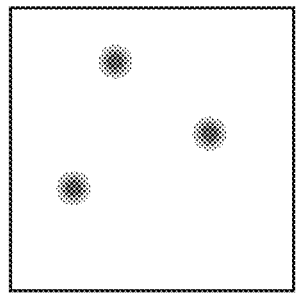
105
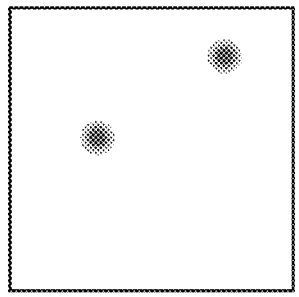
106

FIG.7A

HEAD: ○
UMBRELLA: ◉

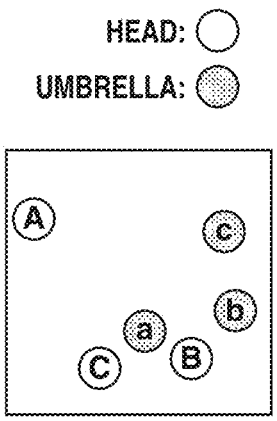

FIG.7B

|   | a | b | c | X1 | X2 | X3 |
|---|---|---|---|---|---|---|
| A | $r_2^2$ | $r_2^2$ | $r_2^2$ | $r_1^2$ | $r_1^2$ | $r_1^2$ |
| B | $1^2$ | $2^2$ | $r_2^2$ | $r_1^2$ | $r_1^2$ | $r_1^2$ |
| C | $2^2$ | $4^2$ | $r_2^2$ | $r_1^2$ | $r_1^2$ | $r_1^2$ |
| X1 | $r_1^2$ | $r_1^2$ | $r_1^2$ | $r_1^2$ | $r_1^2$ | $r_1^2$ |
| X2 | $r_1^2$ | $r_1^2$ | $r_1^2$ | $r_1^2$ | $r_1^2$ | $r_1^2$ |
| X3 | $r_1^2$ | $r_1^2$ | $r_1^2$ | $r_1^2$ | $r_1^2$ | $r_1^2$ |

Columns X1, X2, X3 are DUMMIES 1. Rows X1, X2, X3 are DUMMIES 2.

FIG.7C

|   | a | b | c | X1 | X2 | X3 |
|---|---|---|---|---|---|---|
| A | $r_2^2$ | $r_2^2$ | $r_2^2$ | $r_1^2$ | $r_1^2$ | $r_1^2$ |
| B | $1^2$ | $2^2$ | $r_2^2$ | $r_1^2$ | $r_1^2$ | $r_1^2$ |
| C | $2^2$ | $4^2$ | $r_2^2$ | $r_1^2$ | $r_1^2$ | $r_1^2$ |
| X1 | $r_1^2$ | $r_1^2$ | $r_1^2$ | $r_1^2$ | $r_1^2$ | $r_1^2$ |
| X2 | $r_1^2$ | $r_1^2$ | $r_1^2$ | $r_1^2$ | $r_1^2$ | $r_1^2$ |
| X3 | $r_1^2$ | $r_1^2$ | $r_1^2$ | $r_1^2$ | $r_1^2$ | $r_1^2$ |

Columns X1, X2, X3 are DUMMIES 1. Rows X1, X2, X3 are DUMMIES 2.

FIG.7D

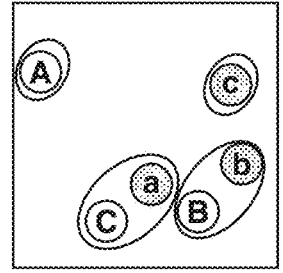

FIG.8A
HEAD: ○
UMBRELLA: ◍
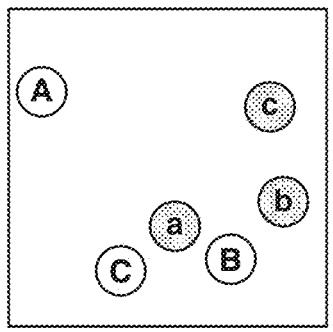
FIG.8B
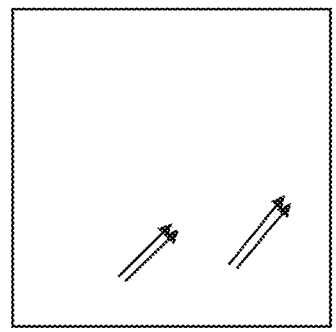
FIG.8C
|   | a | b | c |
|---|---|---|---|
| A | 0 | 0 | 0 |
| B | 0 | 4.2 | 0 |
| C | 3.1 | 0 | 0 |

HEAD: ○
UMBRELLA: ●
INTERMEDIATE POINT: ○

IMAGE PROCESSING APPARATUS, IMAGE PROCESSING METHOD, AND STORAGE MEDIUM FOR DETERMINING A NUMBER OF PERSONS IN AN INPUT IMAGE

BACKGROUND

Field of the Disclosure

The present disclosure relates to a technique for detecting a specific object from an image.

Description of the Related Art

In recent years, there have been proposed systems that perform image analysis processing for estimating the number and flow of people in images captured by imaging apparatuses such as security cameras. Japanese Unexamined Patent Application Publication (Translation of PCT Application) No. 2015-528614 discusses a technique of preparing human models to be used for warm weather, cold weather, and rainy weather, and comparing change areas in an input image with these human models to count the number of people seen in the input image.

SUMMARY

The present disclosure is directed to a technique of correctly counting the number of detection targets either in a case where shielding objects shield partly or entirely the target objects or in a case where the shielding objects are present without shielding the target object.

According to an aspect of the present disclosure, an image processing apparatus includes a first detection unit configured to detect a person in an input image, a second detection unit configured to detect a specific object in the input image, a specification unit configured to specify a combination of the detected person and the detected object indicating an identical person, and a determination unit configured to determine a number of person in the input image, based on the detected person, the detected object, and the specified combination.

Further features of the present disclosure will become apparent from the following description of exemplary embodiments with reference to the attached drawings.

BRIEF DESCRIPTION OF THE DRAWINGS

FIG. 1 is a diagram illustrating an issue of counting the number of detection targets by extension of a prior art.

FIGS. 7A to 7D are diagrams illustrating an example of associations between respective heads and umbrellas based on distances therebetween.

FIGS. 8A to 8C are diagrams illustrating an example of associations between respective heads and umbrellas based on a vector field map.

DESCRIPTION OF THE EMBODIMENTS

Figure 2:
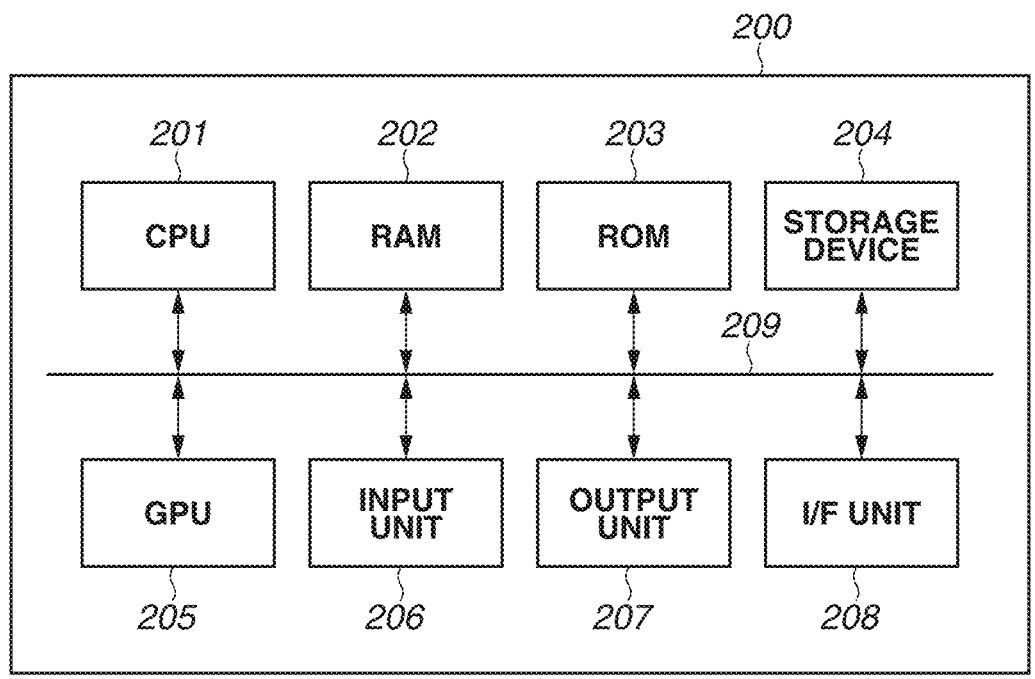
FIG. 2 is a block diagram illustrating an example of a hardware configuration of an image processing apparatus.

An analysis technique for estimating the number and flow of people in an image has enabled detection of congestion in a public space and grasping of the flow of persons at a crowded time. The technique is expected to eliminate congestion during entertainment events and to provide appropriate evacuation guidance in case of disasters. According to a method of estimating the number of detection targets (e.g., persons' heads) based on a density map, the number of detection targets can be correctly detected even with a high degree of congestion as far as the detection targets are visible. However, this method has a problem of deterioration in estimation accuracy if the detection targets are shielded by shielding objects (e.g., umbrellas). For example, persons' heads may be partly or entirely hidden by respective umbrellas on rainy days, so that the accuracy of density map-based estimation can become deteriorated, which leads to deterioration in the accuracy of estimation of the number of persons.

As a simple method for avoiding the above-described problem, an estimator is trained to estimate both density maps of detection targets and of shielding objects. This method makes it possible to correctly count the number of detection targets only if the detection targets have no shielding objects or if the detection targets are completely shielded by the shielding objects. For example, an image 101 in FIG. 1 is an input image indicating a situation where two persons' heads are completely shielded by their respective umbrellas and one person's head is not shielded. When this image is input into the estimator described above, the estimator outputs an estimation results of a head density map 102 indicating the persons' heads and an umbrella density map 103 indicating the umbrellas. If the estimator described above acts ideally, the sum of values of pixels in the head density map 102 is about 1 and the sum of values of pixels in the umbrella density map 103 is about 2, which totals about 3. This means that about three persons are present in the image 101.

However, with this simple method, the accuracy of estimating the number of detection targets with shielding objects will deteriorate if the detection targets are partly hidden or not hidden at all by the shielding objects. For example, an image 104 is an input image indicating a situation where two persons are holding their own umbrellas but their heads are partly hidden or not hidden at all by their respective umbrellas. If this image is input into the above-described estimator, the estimator outputs estimation results of a head density map 105 indicating the persons' heads and an umbrella density map 106 indicating the umbrellas. If the estimator described above acts ideally, the sum of values of pixels in the head density map 105 is about 3 and the sum of values of pixels in the umbrella density map 106 is about 2, which totals about 5. This means that about five persons are present in the image 101. Since three persons are actually present in the image 104, the number larger than the actual number is wrongly counted. In this way, according to the method of comparing a human model with a change area, the number of persons can be accurately counted with a low degree of congestion. However, with a high degree of congestion in which people are crowded to overlap each other, it is difficult to compare between a human model with a change area, resulting in the deterioration of counting accuracy. In order to solve this issue, there is provided an image processing apparatus that is capable of correctly counting the number of detection targets either in a case where the detection targets are partly or entirely shielded by shielding objects or in a case where the shielding objects are present without shielding the detection targets.

Hereinafter, exemplary embodiments of the present disclosure will be described in detail with reference to the accompanying drawings. The configurations illustrated in the following exemplary embodiments are merely examples and the present disclosure is not limited to the configurations illustrated in the drawings.

FIG. 2 illustrates a hardware configuration example of an image processing apparatus 200 according to a first exemplary embodiment. The image processing apparatus 200 includes, as hardware components, a central processing unit (CPU) 201, a random access memory (RAM) 202, a read only memory (ROM) 203, a storage device 204, a graphics processing unit (GPU) 205, an input unit 206, an output unit 207, and an interface (I/F) unit 208, which are connected each other via a system bus 209. The CPU 201 reads and executes the operating system (OS) and other programs stored in the ROM 203 or the storage device 204, using the RAM 202 as a work memory, and controls the components connected to the system bus 209 to perform calculations of various processes and logical judgments. The processes executed by the CPU 101 or the GPU 205 include image processing according to the exemplary embodiments. The storage device 204 is an external memory that stores the programs to be processed by the image processing apparatus 200. The GPU 205 executes arithmetic processes such as a learning process and an image recognition process. The arithmetic processes do not necessarily need to be performed by using a single GPU but may be performed by one or more CPUs, application specific integrated circuits (ASICs), field programmable gate arrays (FPGAs), digital signal processors (DSPs), or the like. The input unit 206 is a human interface device or the like that performs processes relating to information inputting or the like. More specifically, examples of the input unit 206 include a touch panel, a keyboard, a mouse, or a robot controller. The output unit 207 is a display or the like that presents results of processing by the image processing apparatus 200 to the user. The display device may be any type of device such as a liquid crystal display device, a projector, and a light emitting diode (LED) indicator. The I/F unit 208 inputs captured images to the image processing apparatus 200 by connecting a camera or the like to the I/F unit 208. The I/F unit 208 may be a wired interface such as a universal serial bus, an Ethernet cable, or an optical cable, or a wireless interface such as Wi-Fi® or Bluetooth®.

Figure 3:
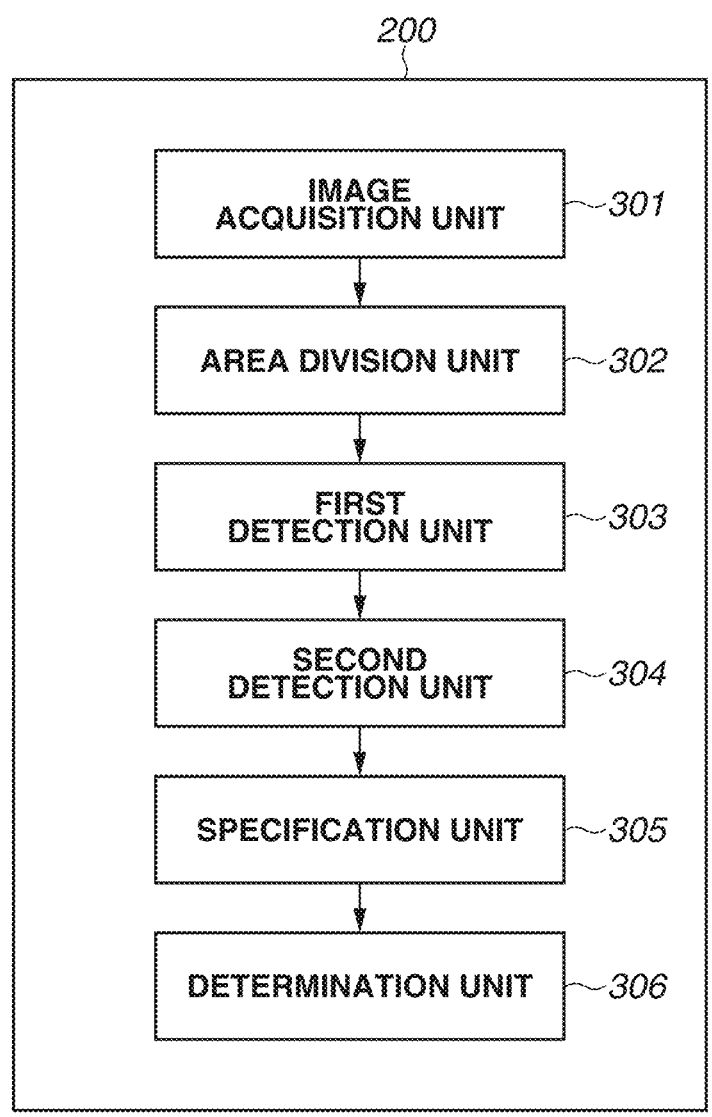
FIG. 3 is a block diagram illustrating an example of a functional configuration of the image processing apparatus according to an exemplary embodiment.

FIG. 3 illustrates a functional configuration example of the image processing apparatus 200 according to the present exemplary embodiment. The image processing apparatus 200 includes, as functional components, an image acquisition unit 301, an area division unit 302, a first detection unit 303, a second detection unit 304, a specification unit 305, and a determination unit 306.

The image acquisition unit 301 acquires an input image. The input image acquired by the image acquisition unit 301 may be an image captured by a security camera or the like, may be an image recorded on a recording device such as a hard disk, or may be an image received via a network such as the Internet. In the image processing apparatus 200 according to the present exemplary embodiment, the input image acquired by the image acquisition unit 301 is used as a target of image analysis. The input image from the image acquisition unit 301 is sent to the area division unit 302.

The area division unit 302 divides the image acquired by the image acquisition unit 301 into predetermined small areas.

Then, the area division unit 302 resizes the small areas into predetermined sizes, thereby generating small images. The sizes after resizing are adjusted to be, for example, image sizes to be input into a learned model used in the subsequent detection process.

The first detection unit 303 estimates the positions of detection targets (e.g., persons' heads) in each of the small images divided by the area division unit 302. In this case, the detection targets are persons, and thus a first learned model is used to detect the persons' heads from the images. The first learned model outputs likelihoods for the individual areas of the input image. In this case, higher likelihoods are given at positions where the persons' heads are highly possibly present in the input image. The positions with likelihoods equal to or higher than a predetermined threshold are positions where the persons' heads are present.

The second detection unit 304 estimates the positions of shielding objects (e.g., umbrellas) in each of the small images divided by the area division unit 302. In this case, a second learned model is used to detect the positions of specific objects (shielding objects) from the input image.

In each of the small images divided by the area division unit 302, the specification unit 305 associates, respectively, the detection targets with the shielding objects, based on the detection target positions estimated by the first detection unit 303 and the shielding object positions estimated by the second detection unit 304. As a result, groups of detection targets alone, groups of detection targets and shielding objects respectively associated with each other, and groups of shielding objects alone are formed.

The determination unit 306 determines the number of detection targets in the input image. The determination unit 306 counts the number of groups obtained by the specification unit 305 in each of the small images divided by the area division unit 302. The determination unit 306 obtains the number of detection targets in the input image by calculating the sum of numbers of groups in all the small images.

Figure 4:
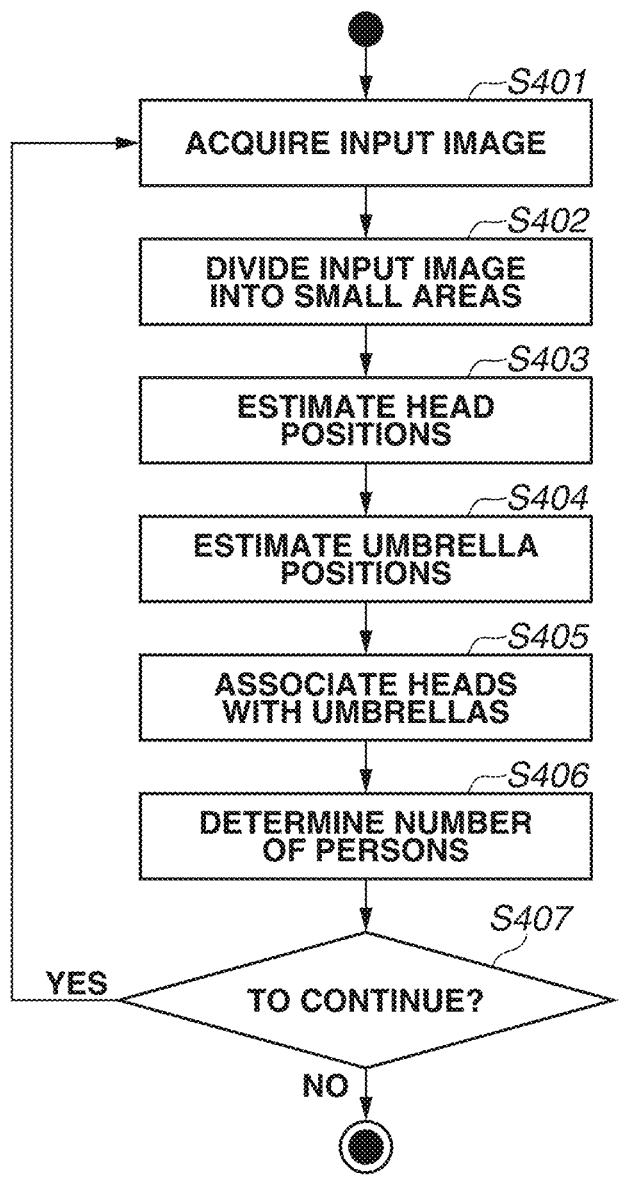
FIG. 4 is a flowchart illustrating image processing by the image processing apparatus.

An example of a flow of a process performed by the image processing apparatus 200 according to the present exemplary embodiment will be described with reference to FIG. 4. Hereinafter, the process will be described with the detection targets as persons' heads and shielding objects as umbrellas, as an example. However, the image analysis process is not limited to this. For example, the detection targets may be persons' eyes and the shielding objects may be sunglasses.

Figure 5:
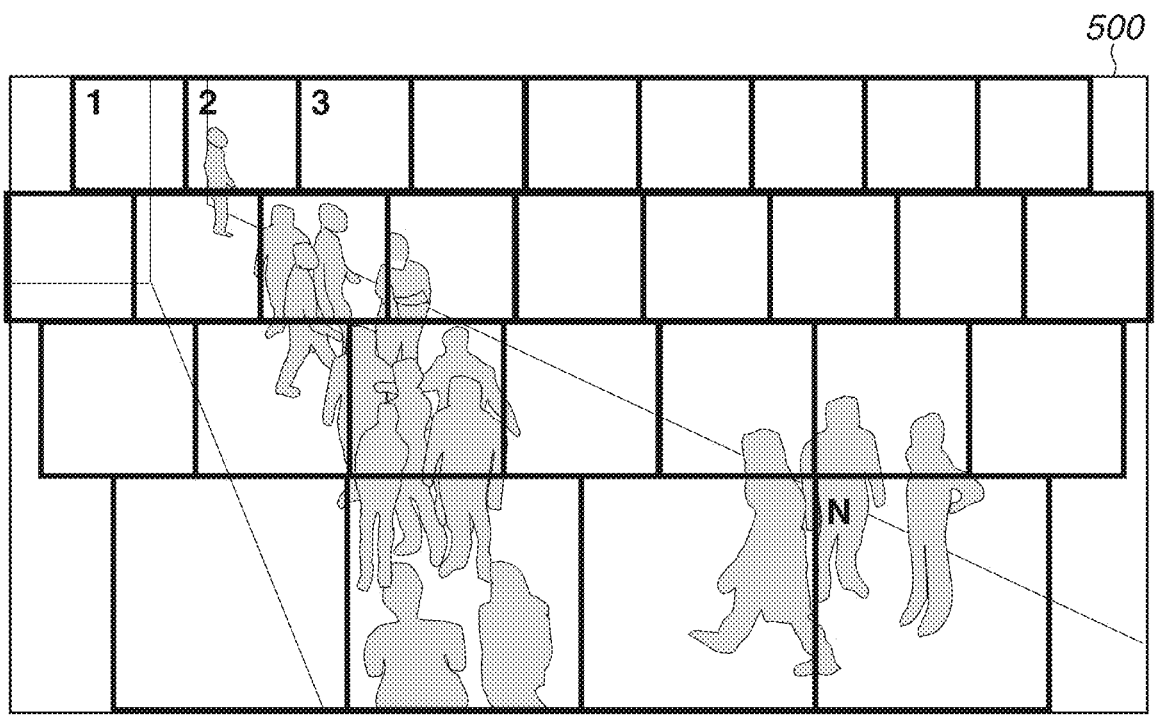
FIG. 5 is a diagram illustrating a division example of an input image.

In step S401, the image acquisition unit 301 acquires an input image. In step S402, the area division unit 302 divides the input image acquired by the image acquisition unit 301 into N small areas according to a predetermined division method. FIG. 5 illustrates an example of area divisions. Rectangles in FIG. 5 each represent small areas obtained by dividing an input image 500. Referring to FIG. 5, the input image 500 is divided so that the respective ratios between the sizes of the small areas and the sizes of human bodies present in the small areas are substantially constant. Next, the area division unit 302 resizes the small areas into predetermined sizes, thereby generating small images. The following processing can be independently performed in the individual small areas, and thus subjecting the small areas into parallel processing produces the advantage of speeding up the entire processing. However, dividing the image into small areas is not essential and the input image may be treated as one small area. In addition, resizing is not essential and the small areas may be treated as they are.

In step S403, the first detection unit 303 detects persons in the input image. The first detection unit 303 uses the first learned model to detect persons' heads from the image. The first detection unit 303 performs a process of estimating the positions of the persons' heads in the small areas divided by the area division unit 302. The positions of the heads can be estimated by using an arbitrary known method. Hereinafter, a method of estimating the head positions through a density distribution will be described.

According to the method of estimating the head positions through a density distribution, first, the density distribution of the heads are estimated from the small areas, and then the head positions are estimated from the density distribution of the heads. These operations will be described in detail.

Figure 6:
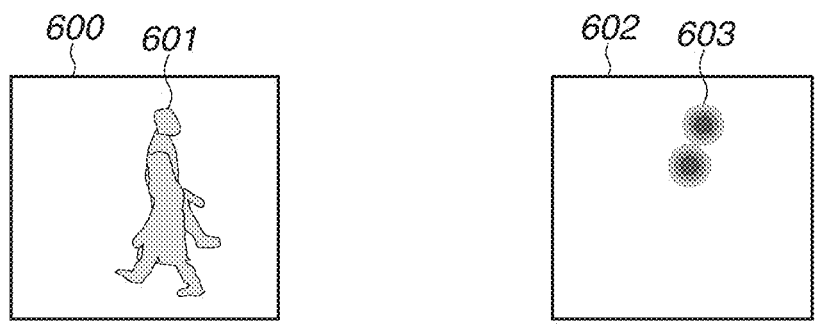
FIG. 6 is a diagram illustrating an example of a small image and a head density distribution corresponding to the small image.

In order to estimate the density distribution from the small areas, the small areas are input in advance into a density estimator (first learned model) into which an image is to be input and from which a head density distribution is to be output. The head density distribution herein is a representation of places where the presence of heads is estimated. FIG. 6 illustrates an example of head density distribution. Referring to FIG. 6, in correspondence to the head position of a person 601 in an input image 600, a density distribution 603 is calculated in an output 602 of the density estimator. The density estimator has undergone in advance learning based on a known learning method such as support vector regression or deep learning. A head position can be estimated from the head density distribution by various methods. For example, coordinates with a local maximum or a value equal to or greater than a standard value in the density distribution can be regarded as indicating a head position. Alternatively, a head position estimator configured to output a head position with density distribution as an input may be subjected in advance to learning based on a known learning method such as deep learning.

The head position estimation methods have been described. However, the head position estimation method is not limited to the above-described methods. For example, a head position may be estimated by using a head detector. The head detector needs to have been subjected to learning based on a known learning method such as support vector machine or deep learning, so that the head detector accepts an input image and outputs head positions. The head positions are represented in rectangular or oval form.

In step S404, the second detection unit 304 detects specific objects (shielding objects) in the input image. The second detection unit 304 uses the second learned model to detect the positions of the specific objects (shielding objects) from the input image. The second detection unit 304 performs a process of estimating the positions of the shielding objects (umbrellas in this case) in all the small images divided by the area division unit 302. The estimation process can be implemented by replacing the persons' heads in the process described above in step S403 with the umbrellas. For example, a density distribution with the peaks of umbrellas as representative points and centers can be defined and the positions of the umbrellas can be estimated through the density distribution of the umbrellas.

In step S405, among the detected persons and shielding objects, the specification unit 305 specifies combinations indicating identical persons. The specification unit 305 performs an association process on the head positions and the umbrella positions in all the small areas divided by the area division unit 302. The association process refers to a process of associating on a one-to-one basis a person's head with an umbrella held by the person. As the result of the association process, groups with the detection targets and the shielding objects being associated on a one-to-one basis, groups of detection targets alone, and groups of shielding objects alone are obtained. Various methods can be applied to the association process.

According to a first association method, costs (first scores) are defined based on the distances between heads and umbrellas, and the heads and the umbrellas are associated so that the costs become minimum on the whole. The combinations may be determined when the costs become lower than a predetermined value. The associations can be made by an existent optimized method such as minimum cost flow or Hungarian matching. In the present exemplary embodiment, an example of association using Hungarian matching will be described.

It is assumed that the positions of three heads A, B, and C are obtained in step S403 and the positions of three umbrellas a, b, and c are obtained in step S404. FIG. 7A illustrates mapping of the head positions and the umbrella positions onto a two-dimensional coordinate system. FIG. 7B illustrates an example of a cost matrix. Each of the components of the cost matrix is a square of the distance between a head position and an umbrella position. However, in order not to bring a distant head and umbrella into matching, three dummies 1, that is, x1, x2, and x3 corresponding to the number of the heads A, B, and C, are added to the columns. In addition, three dummies 2, that is, X1, X2, and X3 corresponding to the number of the umbrellas a, b, and c are added to the rows. The distance at which matching between a head and an umbrella is not prohibited is set as threshold r, the distance between a dummy and an arbitrary point is set to a value $r_1$ larger than r, and the distance longer than r between a combination of a head and an umbrella is set to $r_2$ larger than $r_1$. Thus, the relationship $r<r_1<r_2$ is established.

FIG. 7C illustrates results of associations between heads and umbrellas obtained by performing Hungarian matching based on the dummy matrix. The thick frames in FIG. 7C represent combinations of matched heads and umbrellas. In this example, the head B and the umbrella b are matched, and the head C and the umbrella a are matched. The matched head and umbrella are regarded as one group. The heads or umbrellas matched with dummies, such as the head A or the umbrella c, are treated individually as independent groups. The remaining dummies are matched with one another and thus they can be ignored. FIG. 7D illustrates the groups obtained by Hungarian matching in oval form.

The definition of costs is not limited to the above-described one. For example, the costs may be defined by assigning weights in accordance with the position relationship between umbrellas and heads. For example, since an umbrella generally appears over a person's head, a penalty may be given to the cost of a combination of head and umbrella appearing on a predetermined side of the head (e.g., under the head, although depending on the installation position of the camera).

According to a second association method, there is used a vector field estimator in which an image is input and from which an estimated vector field map is output. The vector field map is a two-dimensional map in which the pixels are two-dimensional vectors and that indicates connections between heads and umbrellas. The direction of the vectors in the pixels located between a certain person's head and the umbrella held by the person coincide with the direction from the head toward the umbrella. Using such a vector field map enables an association between a certain person's head and the umbrella held by the person.

The vector field estimator undergoes in advance learning using a known method such as deep learning, using a combination of input image and correct answer vector field map created from correct answer data. The correct answer vector field map can be created by, for example, a procedure described below. First, as the correct answer data necessary for creation of the correct answer vector field map, a list of combinations of the positions of persons' heads and the positions of umbrellas held by the corresponding persons is prepared. Next, the correct answer vector field map is initialized as a two-dimensional vector field filled with zero vectors, which is the same in size as the input image. Then, for each of the combinations of head positions and umbrella positions in the correct answer data, a unit vector in the direction from the head position toward the umbrella position is repeatedly added to the pixels in the correct answer vector field map located on the line segment connecting the head position and the umbrella position. The vector field estimator can be subjected to learning by, for example, the method based on deep learning described in Cao, Zhe, et al., "Realtime Multi-person 2d Pose Estimation Using Part Affinity Fields", Proceedings of the IEEE Conference on Computer Vision and Pattern Recognition, 2017.

FIGS. 8A to 8C illustrate an example. FIG. 8A is a diagram of mapping of the head positions obtained in step S403 and the umbrella positions obtained in step S404 on a two-dimensional coordinate system. FIG. 8B is a diagram illustrating a vector field obtained by inputting the input image into the vector field estimator. The vector field estimator outputs the vector field that suggests the association between the head C and the umbrella a and the association between the head B and the umbrella b. Then, scores (second scores) are calculated based on the vector field map for all the combinations of the heads obtained in step S403 and the umbrellas obtained in step S404. Each of the scores can be defined by, in the pixels on the line segment connecting the head position and the umbrella position, taking the sum of inner products of the vectors with the head position as a start point and the umbrella position as an end point and the corresponding pixels in the vector field map. It can be considered that the higher the score is, the higher the probability of the head and the umbrella corresponding to each other is. FIG. 8C illustrates an example of scores. The scores are not limited to the above-described definition but may come under an arbitrary definition. For example, the item of assigning a larger value with a shorter distance between the head and the umbrella may be added to the above-described definition of the scores.

Associating the heads with the umbrellas so that the sum of the scores becomes maximum on the whole makes it possible to obtain the associations between the heads and the umbrellas. An example of association method using minimum cost flow will be described. First, the heads obtained in step S403 and the umbrellas obtained in step S404 are regarded as individual nodes. If the score between a head and an umbrella is equal to or greater than a predetermined threshold, i.e., if the matching between a head and an umbrella is allowed, an edge is established from the head node to the umbrella node, with a capacity of 1 and a cost of (−1)× the above-described score. A start point node is added and an edge with a capacity of 1 and a cost of 0 is established from the start point node to all the head nodes. An end point node is added and an edge with a capacity of 1 and a cost of 0 is established from all the umbrella nodes to the end point node. In the network generated in this way, determining the minimum cost flow from the start point node to the end point node makes it possible to determine the associations between the heads and the umbrellas, in which the sum of the scores is maximum. The association method is not limited to this method, and any other existing optimization method such as Hungarian matching can be used instead.

According to a third association method, an intermediate point detection model (estimator) is used to detect an "intermediate point" equivalent to a midpoint in the line segment connecting an associated head and umbrella. The estimation process by the estimator can be implemented by replacing the persons' heads in the method described above in step S403 with intermediate points. For example, a density distribution with intermediate points as centers is defined so that the positions of the intermediate points can be estimated through the density distribution of the intermediate points.

Figure 9A:
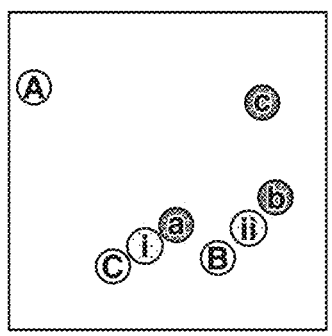
FIGS. 9A and 9B are diagrams illustrating an example of associations between respective heads and umbrellas based on intermediate points.
Figure 9B:
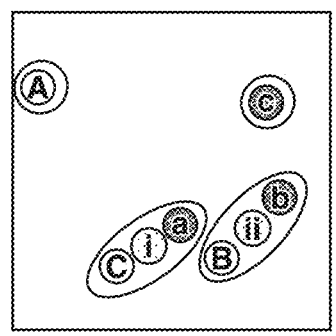

FIGS. 9A and 9B illustrate an example. FIG. 9A illustrates mapping of the head positions obtained in step S403, the umbrellas positions obtained in step S404, and the positions of the intermediate points obtained by the intermediate point estimator on a two-dimensional coordinate system.

The intermediate points are expected to associate with the heads and the umbrellas on a one-to-one basis. Thus, solving a three-dimensional matching problem of making associations between the heads, umbrellas, and intermediate points makes it possible to achieve the associations. The three-dimensional matching can be solved by various methods. For example, first, the heads and the intermediate points are matched by an existing optimized method such as minimum cost flow or Hungarian matching, and then the intermediate points and the umbrellas are matched by the same optimized method. In this case, costs (third costs) are set so as to be smaller as the distance between the head and the intermediate point and the distance between the intermediate point and the umbrella are closer to each other and as the distance from the line segment connecting the head and the umbrella to the intermediate point is shorter. In other words, the combinations are specified based on the third scores acquired in accordance with the distance from each line segment connecting the detected person and the detected object to the corresponding intermediate point. Alternatively, the three-dimensional matching problem can be solved by actively assigning the closest head and umbrella to the corresponding intermediate point. FIG. 9B illustrates groups obtained by the matching in oval form. Interposing intermediate points in associating the heads with the umbrellas increases the probability of correct associations even between the heads and the umbrellas distant from each other.

The specification unit 305 may not clearly perform grouping of heads and umbrellas but may estimate only the number of groups. For example, assume that the number of heads obtained in step S403 is K, the number of umbrellas obtained in step S404 is L, and the number of intermediate points obtained by the intermediate point estimator is M. Considering that ideally one head and one umbrella are associated with one intermediate point, the number of groups including heads, umbrellas, and intermediate points can be approximated to M, the number of groups including heads alone can be approximated to K−M, and the number of groups including umbrellas alone can be approximated to L−M. Accordingly, the number of groups can be estimated to be M+(K−M)+(L−M).

In step S406, the determination unit 306 adds up the numbers of groups obtained in step S405 in all the small images to determine the estimated number of persons in the input image. Alternatively, the number of persons in the input image may be determined by counting the number of specified combinations and the number of detected persons or detected objects not included in the specified combinations.

In step S407, the image processing apparatus 200 determines whether to continue the image analysis process. If the image analysis process is to be continued (YES in step S407), the processing proceeds to step S401. The processing may be ended if there is an end instruction from the user or may be ended after execution of the process for a certain duration of time. Alternatively, the determination unit may output an end instruction after counting a certain number of persons.

As described above, with the image processing apparatus 200 according to the first exemplary embodiment, it is possible to count the number of detection targets either in a case where shielding objects shield partly or entirely detection targets or in a case where shielding objects are present without shielding the detection targets.

Exemplary embodiments of the present disclosure have been described above in detail. However, the present disclosure is not limited to the specific exemplary embodiments but can be modified or changed in various ways within the gist of the present disclosure described in the claims.

The above-described exemplary embodiments merely are examples of carrying out the present disclosure. The technical scope of the present disclosure should not be interpreted in a limited way by these exemplary embodiments.

Thus, the present disclosure can be carried out in various forms without departing from technical ideas or main features thereof.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-202919, filed Dec. 7, 2020, which is hereby incorporated by reference herein in its entirety.

What is claimed is:

1. An image processing apparatus comprising:
   one or more memories storing instructions; and
   one or more processors that, upon execution of the stored instructions, are configured to:
   detect a person in an input image;
   detect a specific object in the input image;
   detect an intermediate point in the input image based on a model configured to output an intermediate point between the person and the specific object;
   specify, based on positional relationships between the detected person, the detected object, and the detected intermediate point, a combination of the detected person and the detected object indicating an identical person; and
   determine a number of persons in the input image, based on the detected person, the detected object, and the specified combination.

2. The image processing apparatus according to claim 1, wherein the number of persons in the input image is determined, by counting each of the specified combination and the detected person or the detected object not included in the specified combination as one person.

3. The image processing apparatus according to claim 1, wherein the combination with a first score calculated based on a distance between the detected person and the detected object being smaller than a predetermined value is specified.

4. The image processing apparatus according to claim 3, wherein the first score is calculated in a combination of respective dummies generated for the detected person and the detected object, the detected person, and the detected object.

5. The image processing apparatus according to claim 4, wherein the first score is set to be higher if the object is located in a predetermined direction of the person, based on positions of the detected person and the detected object.

6. The image processing apparatus according to claim 1, wherein the combination with a second score calculated based on a vector field map indicating a positional relationship between the person and the specific object being higher than a specific value is specified.

7. The image processing apparatus according to claim 6, wherein the second score is calculated based on a value of a vector associated on a line segment connecting the position of the detected person and the position of the detected object in the vector field map.

8. The image processing apparatus according to claim 7, wherein the vector field map is obtained by subjecting a model configured to estimate a likelihood of connection between the person and the specific object to learning for the combination of the person and the specific object based on a correct answer vector having a direction from the specific object toward the person.

9. The image processing apparatus according to claim 1, wherein the combination based on a third score obtained in accordance with a distance from a line segment connecting the detected person and the detected object to the intermediate point is specified.

10. The image processing apparatus according to claim 1, wherein the person is detected by inputting the input image into a learned model configured to detect a position of the person's head.

11. The image processing apparatus according to claim 1, wherein the specific object is detected by inputting the input image into a learned model configured to detect the specific object.

12. A non-transitory computer-readable storage medium storing a program for causing a computer to execute an information processing method, the method comprising:

detecting a person in an input image;

detecting a specific object in the input image;

detecting an intermediate point in the input image based on a model configured to output an intermediate point between the person and the specific object;

specifying, based on positional relationships between the detected person, the detected object and the detected intermediate point, a combination of the detected person and the detected object indicating an identical person; and determining a number of persons in the input image, based on the detected person, the detected object, and the specified combination.

13. An image processing method, comprising:

detecting a person in an input image;

detecting a specific object in the input image;

detecting an intermediate point in the input image based on a model configured to output an intermediate point between the person and the specific object;

specifying, based on positional relationships between the detected person, the detected object and the detected intermediate point, a combination of the detected person and the detected object indicating an identical person; and determining a number of persons in the input image, based on the detected person, the detected object, and the specified combination.

* * * * *